(12) United States Patent
Cho et al.

(10) Patent No.: US 11,332,611 B2
(45) Date of Patent: May 17, 2022

(54) COMPOSITION FOR RADAR TRANSMISSIVE COVER FOR VEHICLE

(71) Applicants: HYUNDAI MOTOR COMPANY, Seoul (KR); KIA MOTORS CORPORATION, Seoul (KR); HYUNDAI ADVANCED MATERIALS CO., LTD., Hwaseong-si (KR)

(72) Inventors: Byung Kyu Cho, Seoul (KR); So Jung Shim, Seoul (KR); Ill Joo Lee, Seoul (KR); Seung Chan Hong, Anseong-si (KR); Jae Hwan Ha, Hwaseong-si (KR); Sang Ho Bang, Cheonan-si (KR); Dong Chang Lee, Cheonan-si (KR); Seung Soo Hong, Osan-si (KR); Wang Kyun Yoon, Pyeongtaek-si (KR); Seung Min Hong, Yongin-si (KR)

(73) Assignees: HYUNDAI MOTOR COMPANY, Seoul (KR); KIA MOTORS CORPORATION, Seoul (KR); HYUNDAI ADVANCED MATERIALS CO., LTD., Hwaseong-si (KR)

(*) Notice: Subject to any disclaimer, the term of this patent is extended or adjusted under 35 U.S.C. 154(b) by 84 days.

(21) Appl. No.: 16/863,410

(22) Filed: Apr. 30, 2020

(65) Prior Publication Data

US 2021/0130607 A1    May 6, 2021

(30) Foreign Application Priority Data

Nov. 4, 2019 (KR) .................. 10-2019-0139539

(51) Int. Cl.
| | | |
|---|---|---|
| C08G 64/02 | (2006.01) | |
| C08L 67/02 | (2006.01) | |
| G01S 7/02 | (2006.01) | |
| C08L 69/00 | (2006.01) | |
| C08L 23/06 | (2006.01) | |
| G01S 13/931 | (2020.01) | |
| C08K 7/14 | (2006.01) | |
| C08K 5/521 | (2006.01) | |

(52) U.S. Cl.
CPC ............... *C08L 67/02* (2013.01); *C08L 23/06* (2013.01); *C08L 69/00* (2013.01); *G01S 7/02* (2013.01); *C08K 5/521* (2013.01); *C08K 7/14* (2013.01); *C08L 2207/066* (2013.01); *G01S 7/027* (2021.05); *G01S 13/931* (2013.01)

(58) Field of Classification Search
USPC .................... 528/196, 198, 272, 274, 337
See application file for complete search history.

(56) References Cited

U.S. PATENT DOCUMENTS

| | | | | |
|---|---|---|---|---|
| 9,957,388 B2* | 5/2018 | Yamanaka | ............. | C08K 5/523 |
| 11,098,190 B2* | 8/2021 | Yoshida | ................. | C08L 63/00 |
| 2009/0326110 A1* | 12/2009 | Tanaka | ..................... | C08K 5/49 |
| | | | | 524/127 |
| 2011/0092616 A1* | 4/2011 | Sakata | .................... | C08L 67/02 |
| | | | | 523/506 |
| 2017/0190884 A1* | 7/2017 | Yun | .......................... | C08K 7/24 |

FOREIGN PATENT DOCUMENTS

| | | |
|---|---|---|
| KR | 2003-0069495 A | 8/2003 |
| KR | 10-0607405 B1 | 8/2006 |
| KR | 10-0957092 B1 | 5/2010 |

\* cited by examiner

*Primary Examiner* — Terressa Boykin
(74) *Attorney, Agent, or Firm* — McDonnell Boehnen Hulbert & Berghoff LLP

(57) ABSTRACT

The present disclosure relates to a composition for a radar transmissive cover for a vehicle, which may enhance dielectric properties while excellently maintaining mechanical properties. The composition, as the composition forming the radar transmissive cover for the vehicle through which a radar beam radiated from a radar is transmitted, has a main material in which 70 to 90 wt % of Polybutylene Terephthalate (PBT) and 10 to 30 wt % of Polycarbonate (PC) are mixed and an additive containing at least reinforcing filler mixed.

7 Claims, 2 Drawing Sheets

FIG. 1

| ITEMS | | 1 | 2 | 3 | 4 | 5 | 6 | 7 | 8 |
|---|---|---|---|---|---|---|---|---|---|
| MATERIAL COMPOSITION | PBT(wt%) | 90 | 80 | 70 | 60 | 100 | 80 | 70 | 60 |
| | PC(wt%) | 10 | 20 | 30 | 0 | 0 | 20 | 30 | 40 |
| | ASA(wt%) | 0 | 0 | 0 | 30 | 0 | 0 | 0 | 0 |
| | PET(wt%) | 0 | 0 | 0 | 10 | 0 | 0 | 0 | 0 |
| | CHEMICAL RESISTANCE IMPROVER | X | O | O | X | X | X | X | O |
| EVALUATION PROPERTIES | DIELECTRIC LOSS | 0.01 | 0.098 | 0.097 | 0.012 | 0.01 | 0.097 | 0.099 | 0.095 |
| | CHEMICAL RESISTANCE | PASS | PASS | PASS | PASS | PASS | NG | NG | NG |
| | PRODUCT BENDING EVALUATION | 0.35 | 0.227 | 0.2 | 0.277 | 0.5 | 0.22 | 0.021 | 0.188 |

FIG. 2

| ITEMS (No.) | | 9 | 10 | 11 | 12 | 13 | 14 | 15 | 16 | 17 | 18 | 19 | 20 | 21 |
|---|---|---|---|---|---|---|---|---|---|---|---|---|---|---|
| MATERIAL COMPOSITION | PBT (wt%) | 80 | 80 | 80 | 90 | 60 | 100 | 80 | 80 | 80 | 80 | 80 | 100 | 80 |
| | PC (wt%) | 20 | 20 | 20 | 10 | 0 | 0 | 20 | 20 | 20 | 20 | 20 | 0 | 20 |
| | ASA (wt%) | 0 | 0 | 0 | 0 | 30 | 0 | 0 | 0 | 0 | 0 | 0 | 0 | 0 |
| | PET (wt%) | 0 | 0 | 0 | 0 | 10 | 0 | 0 | 0 | 0 | 0 | 0 | 0 | 0 |
| | LLDPE (PARTS BY WEIGHT) | 5 | 5 | 5 | 5 | 0 | 0 | 10 | 0 | 0 | 0 | 5 | 2 | 5 |
| INORGANIC FILLER | GF (PARTS BY WEIGHT) | 10 | 15 | 15 | 15 | 30 | 30 | 15 | 15 | 30 | - | - | 15 | 15 |
| | GF LONG AXIS LENGTH (μm) | 300 | 300 | 150 | 300 | 300 | 500 | 300 | 300 | 300 | - | - | 300 | 50 |
| EVALUATION PROPERTIES | DIELECTRIC CONSTANT | 3.09 | 3.15 | 3.1 | 3.17 | 3.37 | 3.54 | INJECTION IMPOSSIBILITY | 3.2 | 3.58 | 2.9 | 2.85 | 3.22 | 3.1 |
| | DIELECTRIC LOSS | 0.0071 | 0.0078 | 0.0075 | 0.0077 | 0.012 | 0.01 | | 0.008 | 0.098 | 0.007 | 0.007 | 0.008 | 0.0075 |
| | IMPACT RESISTANCE STRENGTH (J/m) | 79 | 83 | 70 | 71 | 79 | 70 | NOT RATED | 43 | 87 | 11 | 53 | 50 | 13 |
| | PRODUCT BENDING EVALUATION | OK | OK | OK | OK | OK | NG | NOT RATED | NOT RATED | NOT RATED | NOT RATED | NOT RATED | NOT RATED | OK |

COMPOSITION FOR RADAR TRANSMISSIVE COVER FOR VEHICLE

CROSS REFERENCE TO RELATED APPLICATION

The present application claims priority of Korean Patent Application No. 10-2019-0139539 filed on Nov. 4, 2019, the entire contents of which is incorporated herein for all purposes by this reference.

BACKGROUND

Field of the Disclosure

The present disclosure relates to a composition for a radar transmissive cover for a vehicle, and more particularly, to a composition for a radar transmissive cover for a vehicle, which may enhance dielectric properties while excellently maintaining mechanical properties.

Description of the Related Art

Recently, as interest in an autonomous vehicle increases, the demand for a vehicle radar technology that enables the autonomous running of a vehicle is increasing.

A representative example to which the vehicle radar technology is applied is a smart cruise system.

The smart cruise system is a system for sensing the movement of a preceding vehicle by the radar mounted to the front of the vehicle and controlling an engine and a brake according to the sensed result to accelerate and decelerate the vehicle, thereby avoiding the preceding vehicle to change the lane, or enabling constant speed running after accelerating again at the initially set speed when there is no preceding vehicle.

In order to implement such a smart cruise system, the vehicle is equipped with a radar device, and collects information on the movement of the preceding vehicle and a change in the surrounding environment through the transmission and reception of the laser beam radiated from the radar.

In general, the radar device includes an antenna for transmitting and receiving a laser beam, an internal electronic component such as a millimeter wave Radio Frequency Integrated Circuit (RFIC), and a radome for protecting the same. Further, a cover for protecting the radar device is disposed at the front of the radome.

A transmissive cover for covering the front of a radar module such as the radome and the cover needs sufficient rigidity to protect the internal components such as the antenna inside the radar from the external environment to operate normally, and has the requirement to minimize the transmission loss when transmitting the radar beam radiated from the antenna.

Further, the transmissive cover should be manufactured by using a stabilized material that does not react chemically with chemical components such as vehicle engine oil, gasoline, or ethanol/alcohol.

In general, the material for manufacturing the transmissive cover for covering the front of the radar module such as the radome and the cover is used by mixing the glass fiber (GF) with a reinforcing filler in the main material of the PBT series. However, the glass fiber (GF) mixed with the reinforcing filler increases the mechanical properties of the required material as its content increases, but has a trade-off relationship in which the dielectric properties affecting radar transmission performance are deteriorated.

Further, in the case of the radome through which the radar beam radiated from the antenna is primarily transmitted, a phase difference of the radiating radar beam is generated if the radome dimension is distorted, thereby occurring a beam distortion phenomenon in which the beam pattern is distorted.

Meanwhile, the occurrence of the beam distortion phenomenon is conventionally prevented by further mixing the ASA material with the main material because the beam distortion phenomenon may not be compensated only by the glass fiber mixed with the reinforcing filler in the main material of the PBT series.

However, an acrylic rubber forming the ASA material may deteriorate dielectric properties and shorten the radar beam sensing distance because the radar transmission performance is poor.

The foregoing explained as the background is intended merely to aid in the understanding of the background of the present disclosure, and is not intended to mean that the present disclosure falls within the purview of the related art that is already known to those skilled in the art.

SUMMARY

An object of the present disclosure is to provide a composition for a radar transmissive cover for a vehicle, which may adjust the component so as not to use the component that improves mechanical properties but degrades dielectric properties, thereby enhancing the dielectric properties while excellently maintaining the mechanical properties.

A composition for a radar transmissive cover for a vehicle according to an embodiment of the present disclosure, as the composition forming the radar transmissive cover for the vehicle through which a radar beam radiated from a radar is transmitted, has a main material in which 70 to 90 wt % of Polybutylene Terephthalate (PBT) and 10 to 30 wt % of Polycarbonate (PC) are mixed, and an additive containing at least reinforcing filler mixed.

The main material has 2.5 to 7.5 parts by weight of Linear Low Density PolyEthylene (LLDPE) further mixed with respect to 100 parts by weight of the total amount of the Polybutylene Terephthalate (PBT) and the Polycarbonate (PC).

A phosphorous-based stabilizer is further mixed in the additive.

The main material has 70 to 80 wt % of Polybutylene Terephthalate (PBT) and 20 to 30 wt % of Polycarbonate (PC) mixed, and the phosphorous-based stabilizer has 0.2 to 0.5 parts by weight mixed with respect to 100 parts by weight of the main material.

The phosphorous-based stabilizer is organo-phosphite or Sodium Phosphate.

The reinforcing filler is a glass fiber (GF), and the glass fiber has 10 to 20 parts by weight mixed with respect to 100 parts by weight of the main material.

The glass fiber is 60 to 400 μm in the long axis length.

According to an embodiment of the present disclosure, it is possible to optimize the fraction of Polybutylene Terephthalate (PBT) and Polycarbonate (PC) forming the main material, to enhance the dielectric properties while excellently maintaining the mechanical properties by adding the phosphorus-based stabilizer, and to also secure the chemical resistance.

Therefore, it is possible to minimize the deformation of the product, thereby preventing the radar beam pattern from being distorted, improving the dielectric loss, and solving the problems such as surface discoloration and degradation of the physical properties.

Further, it is possible to reduce the content of the glass fiber relatively compared to the conventional one while using a low specific gravity of the Linear Low Density PolyEthylene (LLDPE), thereby improving the dielectric loss even while securing the same similar mechanical properties.

Further, it is possible to limit a range of the long axis length of the glass fiber, thereby achieving the impact resistance strength and minimizing the deformation of the product.

BRIEF DESCRIPTION OF THE DRAWINGS

The above and other objects, features and other advantages of the present disclosure will be more clearly understood from the following detailed description when taken in conjunction with the accompanying drawings, in which:

FIGS. 1 and 2 are tables illustrating component types, contents, and physical property evaluation values of embodiments and comparative examples.

DETAILED DESCRIPTION

Hereinafter, an embodiment of the present disclosure will be described in more detail with reference to the accompanying drawings. However, the present disclosure is not limited to the embodiments disclosed below but will be implemented in various forms, and only the embodiments are intended to complete the disclosure of the present disclosure, and are provided to fully inform those skilled in the art of the scope of the disclosure.

FIGS. 1 and 2 are tables illustrating component types, contents, and physical property evaluation values of embodiments and comparative examples.

A composition for a radar transmissive cover for a vehicle according to an embodiment of the present disclosure is a composition forming a radar transmissive cover for a vehicle through which a radar beam radiated from a radar is transmitted, and the composition formed according to the present embodiment may be applied to manufacture a cover member, through which a radar beam is transmitted, such as a radome and a front cover applied to a radar device for the vehicle.

The composition for the radar transmissive cover for the vehicle according to an embodiment of the present disclosure is formed by mixing the main material, in which 70 to 90 wt % of Polybutylene Terephthalate (PBT) and 10 to 30 wt % of Polycarbonate (PC) are mixed, with an additive for enhancing mechanical properties such as chemical resistance or impact resistance of the main material.

The main material is components maintaining the overall shape and physical properties of the transmissive cover, and is used by mixing the Polybutylene Terephthalate (PBT) with the Polycarbonate (PC).

The present embodiment formed the main material by setting the total amount of the Polybutylene Terephthalate (PBT) and the Polycarbonate (PC) as 100 wt %. Therefore, the upper limit value of the content of the Polybutylene Terephthalate (PBT) is linked to the content of the Polycarbonate (PC).

If the content of the Polycarbonate (PC) is less than 10 wt %, it is difficult to secure dimensional stability that may exert radar performance, and if the content of the Polycarbonate (PC) exceeds 30 wt %, there is a problem of occurring discoloration and deterioration of physical properties by reacting to chemicals such as ethanol.

As described above, the present embodiment uses Polycarbonate (PC), as the component forming the main material, without using Acrylonitrile-Styrene-Acrylate (ASA) and Polyethylene Terephthalate (PET), which are components that enhance mechanical properties, but on the contrary degrade dielectric properties, thereby securing mechanical properties and dimensional stability.

However, the Polycarbonate (PC) may secure the mechanical properties and the dimensional stability, but as its content increases, chemical resistance is degraded.

Therefore, the present embodiment uses a phosphorus-based stabilizer as an additive to secure the chemical resistance.

That is, the present embodiment uses the Polybutylene Terephthalate (PBT) and the Polycarbonate (PC) as the main material, and among the two components, the Polycarbonate (PC) reacts to chemicals such as ethanol if its content increases, thereby occurring problems such as discoloration and degradation of physical properties, and therefore, the present embodiment uses a phosphorus-based stabilizer as an additive to compensate for degradation of the chemical resistance due to the mixing of the Polycarbonate (PC).

The phosphorus-based stabilizer is a stabilizer such as organo-phosphite or Sodium Phosphate, and suppresses a chemical resistance problem between the Polycarbonate (PC) and the ethanol by the Ester bonding.

At this time, the phosphorus-based stabilizer preferably has 0.2 to 0.5 parts by weight mixed with respect to 100 parts by weight of the main material.

If the content of the phosphorus-based stabilizer is less than 0.2 parts by weight, there is a problem that may not secure the chemical resistance, and if the content of the phosphorus-based stabilizer exceeds 0.5 parts by weight, the excessively added phosphorus-based stabilizer acts as an impurity, thereby degrading physical properties.

Meanwhile, the present embodiment may further mix Linear Low Density PolyEthylene (LLDPE) into the main material to enhance the mechanical properties such as the impact resistance of the transmissive cover. As described above, it is possible to further mix the Linear Low Density PolyEthylene (LLDPE) into the main material, thereby reducing the amount of mixing the additive such as the reinforcing filler that is additionally mixed to enhance the physical properties of the transmissive cover.

At this time, it is preferable to further mix 2.5 to 7.5 parts by weight of the Linear Low Density PolyEthylene (LLDPE) into the main material with respect to 100 parts by weight of the total amount of the Polybutylene Terephthalate (PBT) and the Polycarbonate (PC). If the content of the Linear Low Density PolyEthylene (LLDPE) is less than 2.5 parts by weight, it is difficult to reduce the amount of mixing the reinforcing filler such as a glass fiber because the effect of improving the impact resistance is insufficient, and if the content of the Linear Low Density PolyEthylene (LLDPE) exceeds 7.5 parts by weight, the injection flow is sharply reduced not to evenly disperse the reinforcing filler such as a glass fiber, thereby degrading the injection property.

Further, the present embodiment may further mix the reinforcing filler as an additive to prevent the bending deformation of the transmissive cover.

The reinforcing filler may apply the glass fiber (GF) that may prevent the bending deformation. At this time, the glass fiber preferably has 10 to 20 parts by weight mixed with respect to 100 parts by weight of the main material. If the content of the glass fiber (GF) is less than 10 parts by weight, the effect of enhancing the mechanical properties such as reducing the bending deformation amount is insignificant, and if the content of the glass fiber (GF) exceeds 20 parts by weight, the effect of improving the dielectric loss may not be expected due to an increase in the dielectric loss.

As described above, the glass fiber (GF), which is the reinforcing filler used to prevent the bending deformation of the transmissive cover, may expect the effect of enhancing the mechanical properties, but has a drawback of increasing the dielectric loss.

Therefore, the present embodiment reduces the amount of mixing the glass fiber (GF), which is the reinforcing filler, while further mixing the Linear Low Density PolyEthylene (LLDPE) into the main material, thereby improving the dielectric loss to enhance radar transmission performance.

Meanwhile, the glass fiber (GF) used as the reinforcing filler has a needle-like shape, and deformation of the product may be caused by a difference between the long axis and short axis lengths of the glass fiber. Therefore, it is preferable to limit the long axis length of the glass fiber.

For example, the glass fiber (GF) is preferably 60 to 400 μm in the long axis length. The glass fiber (GF) may reduce the deformation such as bending if the long axis length thereof is less than 60 μm, but the required impact resistance strength is sharply reduced, and it is difficult for the glass fiber (GF) to be used as the transmissive cover material because the deformation such as bending occurs at a considerable level if the long axis length thereof exceeds 400 μm.

Next, the present disclosure will be described through comparative examples and embodiments.

The specimens were manufactured by changing the types and contents of the main material and the additive and then the dielectric loss, the chemical resistance, and the product bending evaluation were performed.

The types and contents of the main material and the additive were changed as in FIG. 1, and the evaluation results were illustrated in FIG. 1 together. At this time, in the evaluation according to FIG. 1, each specimen added 30 parts by weight of the GF, which is the reinforcing filler, with respect to 100 parts by weight of the main material in the same manner as the reinforcing filler applied to a general commercial material in order to find out the characteristics according to the contents (wt %) of the PBT and the PC used as the main material and whether to use the chemical resistance improver used as the additive. Further, in the case of the chemical resistance improver, a phosphorus-based stabilizer was used as the chemical resistance improver when used, and 0.3 parts by weight was used equally with respect to 100 parts by weight of the main material.

Further, the bending evaluation of the specimen evaluated the bending level of the product by manufacturing a radome product, and then irradiating a laser scan on the upper end portion thereof to check the high point and low point of the Z axis.

Further, the evaluation of the dielectric constant and the dielectric loss complied with ASTM D2520, JISC256 standards, and the official test name is Standard Test Methods for Complex Permittivity (dielectric Constant). The specimen was manufactured as a sample of 3×10×30 mm to put it in a metal empty space, and the dielectric constant and the dielectric loss were measured by measuring the amount of a change in the resonant frequency of the corresponding area with the specimen and without the specimen.

Further, the impact resistance evaluation used an ASTM D256 evaluation standard, and the IZOD impact strength measurement was performed on the specimen manufactured in a thickness of 3.2 mm at room temperature (23 degrees Celsius).

The chemical resistance evaluation observed appearance of the specimen, which directly dropped chemicals, such as gasoline, diesel, high-gloss wax, engine oil, ethanol, and acetone, on the effective surface of the specimen by using a spuit, or the like, was left at room temperature for 1 hour, then injected in an 85° C. chamber, taken out after 3 hours, and had chemicals wiped off, with the naked eye, and if no crack, discoloration, fading, blistering, and the like were observed, it was determined as 'PASS', and if crack, discoloration, fading, blistering, and the like were observed, it was determined as 'NG'.

Meanwhile, the composition according to the present disclosure is a composition forming the radar transmissive cover for the vehicle, and it is preferable that the dielectric loss is 0.01 or less, the product bending evaluation is 0.35 mm or less, the impact resistance strength is 70 or more, and the chemical resistance is evaluated as satisfaction (PASS).

In order to prevent the radar beam distortion, the dimensional stability of the radome is very important. Therefore, as may be confirmed in FIG. 1, it could be confirmed that No. 4 specimen, which is a conventional commercial material, showed the level of satisfying the product bending evaluation (0.35 mm or less) by adding the ASA for the dimensional stability, but the dielectric loss was poor.

Meanwhile, No. 5 specimen made only of the PBT excluding the ASA for improving the dielectric loss had the excellent dielectric loss but the results of the product bending evaluation were greatly bad, thereby making it difficult to use as the radome material.

Further, Nos. 1 to 3 specimens and Nos. 6 to 8 specimens were specimens forming the main material by mixing the PBT with the PC in a state excluding the ASA, and in the case of the No. 1 specimen, the dielectric loss was low because the content of the PC was relatively low, and the phosphorus-based stabilizer, which was the chemical resistance improver, was not added, but there was no problem in the chemical resistance.

Further, in the case of Nos. 6 and 7 specimens, it could be confirmed that the chemical resistance was degraded by reacting to chemicals such as ethanol as the content of the PC gradually increased.

On the other hand, in the case of Nos. 2 and 3 specimens, a phosphorus-based stabilizer such as organo-phosphite or Sodium Phosphate was mixed to compensate for the degradation of the chemical resistance. As a result, the chemical resistance was improved, which may be inferred that it was caused by the structural stabilization through the pre-bonding with a reactor that causes the ester bonding between the PC and the ethanol through the phosphorus-based stabilizer.

Meanwhile, in the case of No. 8 specimen, the phosphorus-based stabilizer, which is the chemical resistance improver, was added, but the content of the PC was too high to exert the effect of improving the chemical resistance.

Next, the test was performed to further mix the LLDPE to compensate for the degradation of stiffness while reducing the content of the GF used as the reinforcing filler for improving the dielectric loss.

At this time, the specimens were manufactured by changing the types and contents of the main material and the additive, and then the dielectric constant, the dielectric loss, the impact resistance strength (J/m), and the product bending evaluation were performed.

The types and contents of the main material and the additive were changed as in FIG. 2, and the evaluation results were illustrated in FIG. 2 together. At this time, each specimen mixed the phosphorus-based stabilizer used as the chemical resistance improver except for No. 12 specimen.

Meanwhile, it is important to reduce the dielectric loss of the material to improve the radar sensing performance. In the case of radome components, the impact resistance strength is inevitably needed to prevent problems such as deformation and damage from the external environment, and to this end, it is used by mixing the GF as in the specimens of the above-described test for the purpose of reinforcing physical properties.

As in the case of Nos. 18 and 19 specimens, it could be confirmed that the specimens that did not mix the GF had very excellent dielectric loss, but had the relatively low impact resistance strength.

However, it could be confirmed that the GF is a material factor that most adversely affects the radar sensing performance, and as in the case of Nos. 13, 14, and 17 specimens, a value of the dielectric loss increased as the amount of mixing the GF increased.

That is, it could be confirmed that the dielectric loss and the impact resistance strength have the trade-off relationship according to the addition of the GF, which is the reinforcing filler.

Therefore, the present disclosure further mixes the LLDPE into the main material to also satisfy the impact resistance strength reference condition at the same time while reducing the content of the GF to improve the dielectric loss.

It could be confirmed that in the case of Nos. 9 to 12 specimens that further mixed the LLDPE into the PBT and the PC than Nos. 18 and 19 specimens that did not mix the GF and Nos. 16 and 17 specimens that formed the main material only with the PBT and the PC, the impact resistance strength increased by about 5 times.

As a result, it could be confirmed that even when the GF was added by 15 parts by weight or less, the impact resistance strength was secured and the dielectric loss was also improved by about 35% compared to the commercial material (No. 13).

It could be confirmed that in the case of No. 16 specimen in which no LLDPE was added and the amount of mixing the GF was 15 parts by weight, the impact resistance strength was not sufficiently satisfied.

Meanwhile, as the content of the LLDPE increases, the impact resistance strength may be increased without affecting the dielectric loss, but when 10 parts by weight of the LLDPE is added as in No. 15 specimen, the dispersibility of GF is not secured and therefore, it is not suitable for use as a material because it does not become the injection itself.

Meanwhile, the GF may cause a slight deformation of the radome material by a difference between the long and short axes lengths, which may cause occurring deformation of the radar beam radiated from the radar antenna.

The GF has less deformation of the radar beam as the difference between the long and short axes lengths is smaller (the more spherical). In reality, in the case where the long axis length was short (50 μm) as in the case of No. 21 specimen, the bending evaluation reference resulted in the best results, but the impact resistance strength sharply reduced, thereby making it impossible to use as the radome material.

On the other hand, as in the case of No. 14 specimen, when the product in which the long axis length of the GF is long (500 μm) was manufactured, the strength could be secured but the product bending deformation was severe, thereby making it impossible to use as the radome material.

Meanwhile, Nos. 9 to 12 specimens were specimens satisfying the types and contents of the components presented in the present disclosure, and showed the levels all satisfying the dielectric constant, the dielectric loss, the impact resistance strength, and the product bending evaluation.

While the present disclosure has been described with reference to the accompanying drawings and the above-described preferred embodiments, the present disclosure is not limited thereto, and is limited by the claims to be described later. Therefore, those skilled in the art may variously change and modify the present disclosure without departing from the technical spirit of the claims to be described later.

What is claimed is:

1. A composition for a radar transmissive cover for a vehicle, as the composition is configured to be used in forming the radar transmissive cover for the vehicle through which a radar beam radiated from a radar is transmitted, the composition comprising:
    a main material in which 70 to 90 wt % of Polybutylene Terephthalate (PBT) and 10 to 30 wt % of Polycarbonate (PC) are mixed; and
    an additive comprising at least reinforcing filler is mixed.

2. The composition for the radar transmissive cover for the vehicle according to claim 1, wherein the main material has 2.5 to 7.5 parts by weight of Linear Low Density PolyEthylene (LLDPE) further mixed with respect to 100 parts by weight of the total amount of the Polybutylene Terephthalate (PBT) and the Polycarbonate (PC).

3. The composition for the radar transmissive cover for the vehicle according to claim 1, wherein a phosphorous-based stabilizer is further mixed in the additive.

4. The composition for the radar transmissive cover for the vehicle according to claim 3, wherein the main material has 70 to 80 wt % of Polybutylene Terephthalate (PBT) and 20 to 30 wt % of Polycarbonate (PC) mixed, and wherein the phosphorous-based stabilizer has 0.2 to 0.5 parts by weight mixed with respect to 100 parts by weight of the main material.

5. The composition for the radar transmissive cover for the vehicle according to claim 4, wherein the phosphorous-based stabilizer is organo-phosphite or Sodium Phosphate.

6. The composition for the radar transmissive cover for the vehicle according to claim 1, wherein the reinforcing filler is a glass fiber (GF), and wherein the glass fiber has 10 to 20 parts by weight mixed with respect to 100 parts by weight of the main material.

7. The composition for the radar transmissive cover for the vehicle according to claim 6, wherein the glass fiber is 60 to 400 μm in the long axis length.

* * * * *